UNITED STATES PATENT OFFICE.

CARL SIEDENTOPF, OF MAGDEBURG, GERMANY.

METHOD OF DRESSING MORTAR MADE OF LIME AND SAND.

1,108,406. Specification of Letters Patent. Patented Aug. 25, 1914.

No Drawing. Application filed November 24, 1913. Serial No. 802,761.

*To all whom it may concern:*

Be it known that I, CARL SIEDENTOPF, a subject of the King of Prussia, German Emperor, residing at Magdeburg, in the Kingdom of Prussia, German Empire, have invented certain new and useful Improvements in Methods of Dressing Mortar Made of Lime and Sand, of which the following is a specification.

The dressing of mortar made of lime and sand is effected generally by mixing the two raw materials, namely the sand, respectively a material which contains silicic acid, and lime in determined proportions in addition a certain quantity of water. The mixture is left in silos, in mixing drums or similar apparatuses, until the lime has been transformed by the water into hydrate of lime. During this chemical transformation of the lime heat is generated whereby the mixture of sand and lime, the mortar, is strongly heated and the chemical combination of the hydrate of lime with the silicic acid of the sand to calcium, hydrosilicate is already started. This transformation produces later on the hardening of the chalky sandstone or of the mortar. The slaking of the lime as well as the formation of the silicate are considerably influenced by the fact that the largest part of the heat developed by the slaking of the lime is absorbed by the sand which generally comes directly from the sand-pit. The lime serves in the mortar only as binding medium and presents about 8% of the weight of the mortar. This inconvenience can be avoided by heating the sand or the mortar artificially for example, by means of steam; whereby however a considerable quantity of steam is consumed.

In order to produce a mortar which can be easily pressed and from which stones of uniform good quality and of uniform high resisting quality can be made it is not only necessary to mix well the raw materials in the mortar but further, to uniformly heat the material fed to the presses. This is however impossible without special heating means if the mortar is prepared according to the known methods. The hereinbefore mentioned conditions for the production of a good dressing and uniform heating of large quantities of lime sand are fulfilled according to the new dressing method without the use of separate heating devices by admixing with the freshly mixed mass of lime and sand, hot mortar which has already been perfectly dressed or which is still being dressed but which, in any case, is hot. The heat developed by the slaking of the fresh lime is thus not absorbed by the sand as the sand is heated by the hot mortar. By mixing together mortars which are at different states of composition, a uniform heating of the mixture of lime and sand is insured.

For the execution of the improved method various devices can be used, for example, a conveying tube of large dimensions. The fresh mass of lime and sand is introduced at one end of the conveying tube and dressed during its passage through the tube, that is to say the lime is transformed into hydrate of lime by the absorption of water and owing to the heat generated, the formation of silicate is started at the same time as has been hereinbefore explained. At the other end of the tube, or at an intermediate point of the same, the hot mortar or part of the same is taken off and brought back to the beginning of the tube by means of a conveying screw to be introduced again into the conveying tube together with a fresh mass of mixed lime and sand.

For executing the improved method silos can be used into the upper end of which the fresh mass of lime and sand is put, the mortar being dressed during the passage of the lime and sand mass through the silos. The entire mass of hot mortar, or part of the same, is removed from the silo at the lower end or at an intermediate point, and lifted, by means of a bucket elevator or the like, to the upper end of the silo to be admixed with the fresh mass of lime and sand which is thus heated by the mortar in preparation. In any case, the self heating of the mortar can be completed by artificial heating.

There have already become known methods for the dry slaking of lime according to which limes at different states of slaking are mixed together in such a manner that lime which is difficult to slake is separated from the others to be exposed again to the heat generated by the slaking of the fresh lime. These methods consist in a separate treatment of previously slaked lime by the heat from fresh slaked lime while, according to the method which forms the object of the present application, large quantities of lime and sand are uniformly heated and while not only the lime contained in said mass is slaked but the formation of silicate is simultaneously started, so that mortar which has been heated by the slaking of the lime, is used for acting upon the fresh material. It has further become known, to utilize the heat resulting from the slaking of lime by condensing the vapors generated by the slaking and in utilizing the warm water of condensation for the slaking of fresh lime. This utilization of heat has nothing in common with the object of the present application, as with this known method only a small part of the heat from slaking is utilized and this only indirectly through the utilization of the water from condensation while, according to the improved method, hot mortar is directly admixed with the fresh mixture whereby a compensation of heat is obtained.

According to the known methods the fresh lime is heated merely for the purpose of increasing its slaking energy; according to the improved method however there is substituted for the quantity of heat which is usually absorbed by large masses of sand, the heat from the hot mortar which is admixed with the fresh masses so that the slaking of the lime is not impeded and the formation of silicate favorized. Besides, the known methods serve for slaking lime and not for dressing mortar. The dressing of mortar is effected, as can be easily and clearly seen from the above explanations, with different results and for a different purpose.

The improved dressing method can be applied also if not only lime but other binding means are used for example, cement, coloring substances, etc., and if, instead of the sand, other substances are employed which contain silicic acid, such as for example blast-furnace-cinder.

I claim:—

An improved method for dressing mortar made of lime and sand consisting in admixing with the fresh mixture of lime and sand, mortar from a previous dressing which is hot by reason of chemical action, for the purpose of substituting for the heat from slaking which is usually absorbed by the sand admixed with the lime the heat of the mortar already dressed, substantially as described and shown and for the purpose set forth.

In witness whereof I have hereunto set my hand in the presence of two witnesses.

CARL SIEDENTOPF.

Witnesses:
 HANZ EYTLE,
 L. OCHLMANN.